(12) United States Patent
Thomas et al.

(10) Patent No.: US 10,757,863 B2
(45) Date of Patent: Sep. 1, 2020

(54) DEVICE AND METHOD FOR CHANGING CLEANING SHOE SHAKER ARM ANGLE

(71) Applicant: CNH Industrial America LLC, New Holland, PA (US)

(72) Inventors: Jeffrey Thomas, Gordonville, PA (US); Curtis Frederick Hillen, Lititz, PA (US); Kevin Scotese, New Holland, PA (US); Todd Cannegieter, Leola, PA (US); Karl Linde, Leola, PA (US); Daniel Thomas Turner, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 245 days.

(21) Appl. No.: 16/015,875

(22) Filed: Jun. 22, 2018

(65) Prior Publication Data

US 2019/0387682 A1 Dec. 26, 2019

(51) Int. Cl.
*A01F 12/44* (2006.01)
*A01F 12/32* (2006.01)
*A01D 41/127* (2006.01)

(52) U.S. Cl.
CPC ........ *A01F 12/448* (2013.01); *A01D 41/1276* (2013.01)

(58) Field of Classification Search
CPC .. A01D 41/12; A01D 41/1276; A01D 75/282; A01F 12/32; A01F 12/305; A01F 12/448; A01F 12/446; A01F 12/56
USPC .......................... 460/1, 92, 93, 101; 299/233
See application file for complete search history.

(56) References Cited

U.S. PATENT DOCUMENTS

| | | | |
|---|---|---|---|
| 239,376 A | 3/1881 | Elward | |
| 336,399 A | 2/1886 | Ellis | |
| 546,246 A | 9/1895 | Perron | |
| 680,187 A * | 8/1901 | Zimmerman | A01F 12/448 460/101 |
| 1,138,591 A | 5/1915 | Hawthorne | |
| 3,757,797 A | 9/1973 | Mathews | |
| 5,795,223 A * | 8/1998 | Spiesberger | A01F 12/448 460/102 |
| 6,066,045 A | 5/2000 | Noomen | |
| 7,322,882 B2 | 1/2008 | Duquesne et al. | |

(Continued)

FOREIGN PATENT DOCUMENTS

| | | |
|---|---|---|
| EP | 1889533 A2 | 2/2008 |
| EP | 2936967 A1 | 10/2015 |
| EP | 3498078 A1 | 6/2019 |

OTHER PUBLICATIONS

Extended European Search Report for EP Application No. 19181645.3 dated Nov. 12, 2019 (five pages).

*Primary Examiner* — Robert E Pezzuto
(74) *Attorney, Agent, or Firm* — Peter Zacharias; Patrick Sheldrake

(57) ABSTRACT

A cleaning system for a combine harvester having an adjustable throwing angle is provided. The cleaning system includes a shoe for holding a sieve of the cleaning system, a mounting surface disposed on the shoe, and a rocker arm either movably or removably connected to the mounting surface. The rocker arm is configured to be mounted to the mounting surface at at least two different locations on the mounting surface. Each location resulting in a different throwing angle of the shoe of the cleaning system.

20 Claims, 7 Drawing Sheets

(56) References Cited

U.S. PATENT DOCUMENTS

| | | |
|---|---|---|
| 7,553,226 B2 | 6/2009 | Dhont et al. |
| 9,622,415 B2 * | 4/2017 | Duquesne ............. A01F 12/448 |
| 9,693,506 B2 | 7/2017 | De Smet et al. |
| 2006/0229119 A1 * | 10/2006 | Wamhof ................ A01F 12/44 |
| | | 460/101 |
| 2015/0296712 A1 | 10/2015 | Duquesne et al. |
| 2015/0319931 A1 * | 11/2015 | Missotten ............. A01D 41/12 |
| | | 460/101 |
| 2016/0029562 A1 | 2/2016 | De Smet et al. |
| 2017/0086380 A1 | 3/2017 | Walter et al. |

* cited by examiner

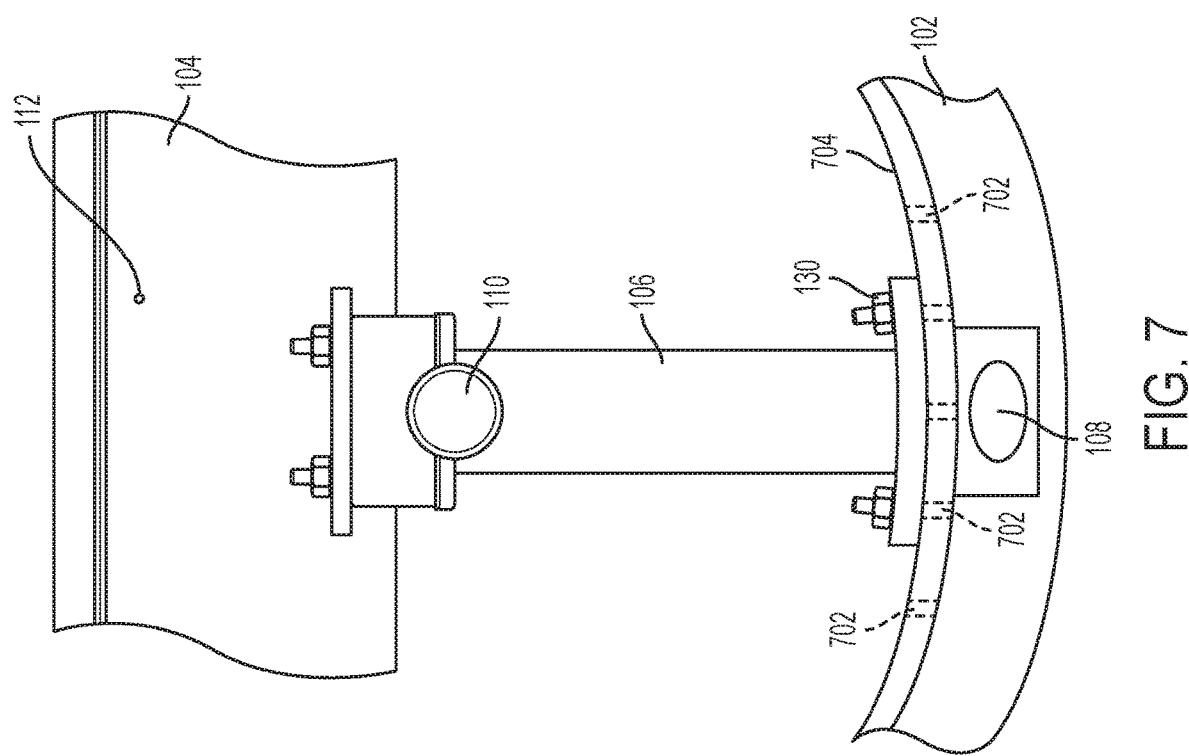

DEVICE AND METHOD FOR CHANGING CLEANING SHOE SHAKER ARM ANGLE

FIELD OF THE INVENTION

The invention relates generally to a cleaning system of a combine harvester, and more particularly, to a cleaning system having an adjustable throwing angle.

BACKGROUND OF THE INVENTION

A combine harvester has a cleaning system for separating harvested seeds from by-products that are harvested along with said seeds.

Combine harvesters are widely used in the harvesting of various types of grain, corn and other crops of which the seed is harvested. Typically, a combine harvester cuts the plants that contain the seeds to be harvested from the field. The harvested crop is threshed inside the combine harvester, in which process the seeds are separated from the other parts of the plants. The stalks of the harvested plants are removed from the combine harvester and a mixture of harvested seeds and by-products remains in the combine harvester.

The mixture of harvested seeds and by-products is transported to a cleaning system, in which the threshed seeds are separated from the by-products. The cleaning system generally comprises one or more sieves, which perform a reciprocating movement during use. The sieved seeds are then collected and transported to the grain tank of the combine harvester, which is generally emptied periodically.

Relevant examples of cleaning systems are described in U.S. Patent Application Publication Nos. 2016/0029562 and 2015/0296712, each of which is incorporated by reference herein in its entirety for all purposes. The location of a cleaning system in a combine is shown in U.S. Patent Application Publication No. 2015/0296712.

The sieve or sieves of the cleaning system are generally arranged at an angle relative to the horizontal, with the front end of the sieve lower than the rear end of the sieve. It is known to arrange the sieve on rocker (i.e., shaker) arms and to drive the sieve in a reciprocation motion via an eccentric device in combination with a pitman arm. The eccentric device may comprise a crank or an eccentric disc that is driven by an input drive.

The reciprocating movement of the sieve causes the seeds and by-products to be thrown upwards and backwards by the sieve. More particularly, the reciprocation sieve movement comprises a throw stroke and a return stroke. During the throw stroke, the sieve throws the harvested seeds and by-products upward from the sieve. During the return stroke, the sieve moves back from the end position of the throw stroke to the beginning position of the throw stroke. The harvested seeds and by-products are airborne during most of the return stroke of the sieve. A fan blows the airborne lighter weight by-products towards the rear of the combine. The harvested seeds and remaining by-products fall back onto sieve during the last part of the decelerating portion of the return stroke.

The reciprocating sieve movement has several movement parameters, including stroke length and throwing angle. The sieve stroke length is the distance between the foremost position and the hindmost position of the sieve during the sieve movement. The sieve throwing angle is the angle at which the grain is thrown up from the sieve during the reciprocating movement of the sieve.

To adjust the throwing angle of a sieve in a typical combine, it is often necessary to remove the entire rocker arm and then reposition that rocker arm to a different angle. It would be desirable to provide a simple way to adjust the throwing angle of a sieve without either removing or completely removing the rocker arm.

SUMMARY OF THE INVENTION

An embodiment includes a cleaning system for a combine harvester having an adjustable throwing angle. The cleaning system comprises a shoe for holding a sieve of the cleaning system, a mounting surface disposed on the shoe, and a rocker arm either movably or removably connected to the mounting surface. The rocker arm is configured to be mounted to the mounting surface at at least two different locations on the mounting surface, each location resulting in a different throwing angle of the shoe of the cleaning system.

Another embodiment includes a combine harvester comprising a shoe for holding a sieve of a cleaning system of the combine harvester, a mounting surface either attached to or extending from the shoe, the mounting surface being either slanted or curved, and a frame for supporting the shoe. The shoe is movably connected to the frame by a rocker arm. The rocker arm includes two opposed ends, one opposed end being releasably connected to the mounting surface of the shoe, and the other opposed end being connected to the frame. The one opposed end of the rocker arm being configured to be mounted to the mounting surface at at least two different locations on the mounting surface, each location resulting in a different throwing angle of the shoe of the cleaning system.

Yet another embodiment includes a combine harvester comprising a shoe for holding a sieve of a cleaning system of the combine harvester, a frame for supporting the shoe, and a rocker arm pivotably connecting the shoe to the frame. The rocker arm includes two opposed ends, one opposed end being releasably connected to a mounting surface disposed on one of the shoe and the frame, and the other opposed end being connected to the other of the shoe and the frame. Said one opposed end of the rocker arm being configured to be mounted to the mounting surface at at least two different locations on the mounting surface, each location resulting in a different throwing angle of the shoe of the cleaning system.

BRIEF DESCRIPTION OF THE FIGURES

FIG. 7 depicts a side elevation view of a cleaning system of a combine according to still another alternative embodiment.

DETAILED DESCRIPTION

Figure 1:
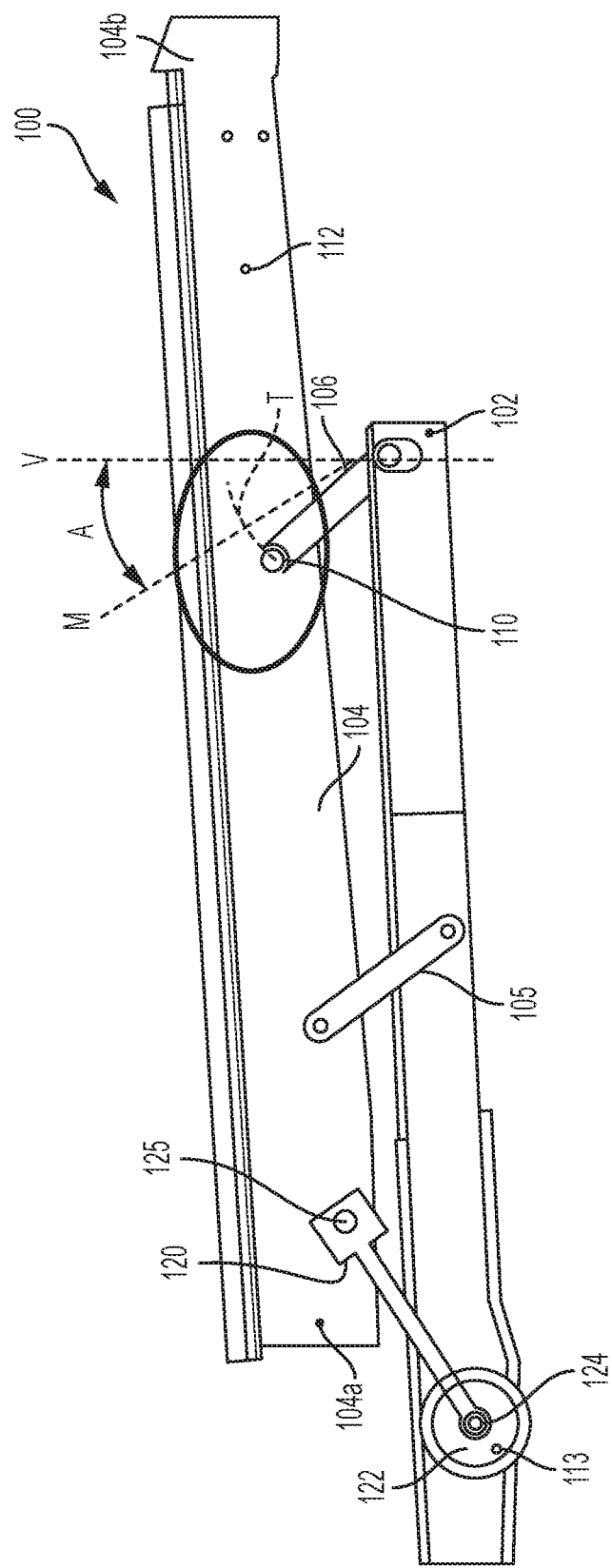
FIG. 1 is a side elevation view of a cleaning system of a combine.

The drawing figures depict one or more implementations in accord with the present concepts, by way of example only, not by way of limitations. In the figures, like reference numerals refer to the same or similar elements.

The terms "grain," "seeds," "straw," and "tailings" may be used principally throughout this specification for convenience but it is to be understood that these terms are not intended to be limiting. Thus "grain" or "seeds" refers to that part of the crop material which is threshed and separated from the discardable part of the crop material, which is referred to as non-grain crop material, material other than grain (MOG) or straw.

Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 2:
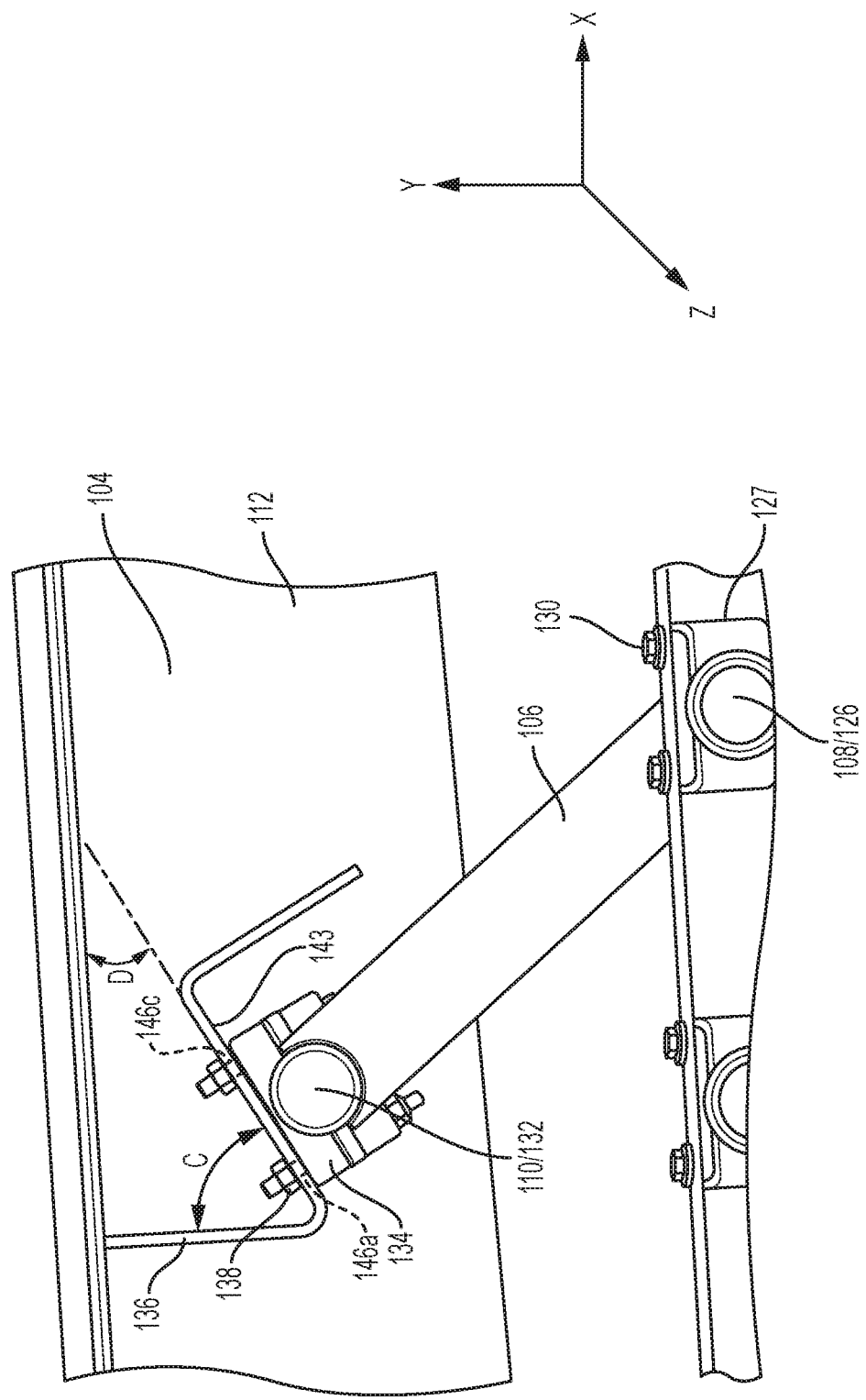
FIG. 2 is a detailed view of FIG. 1.
Figure 3:
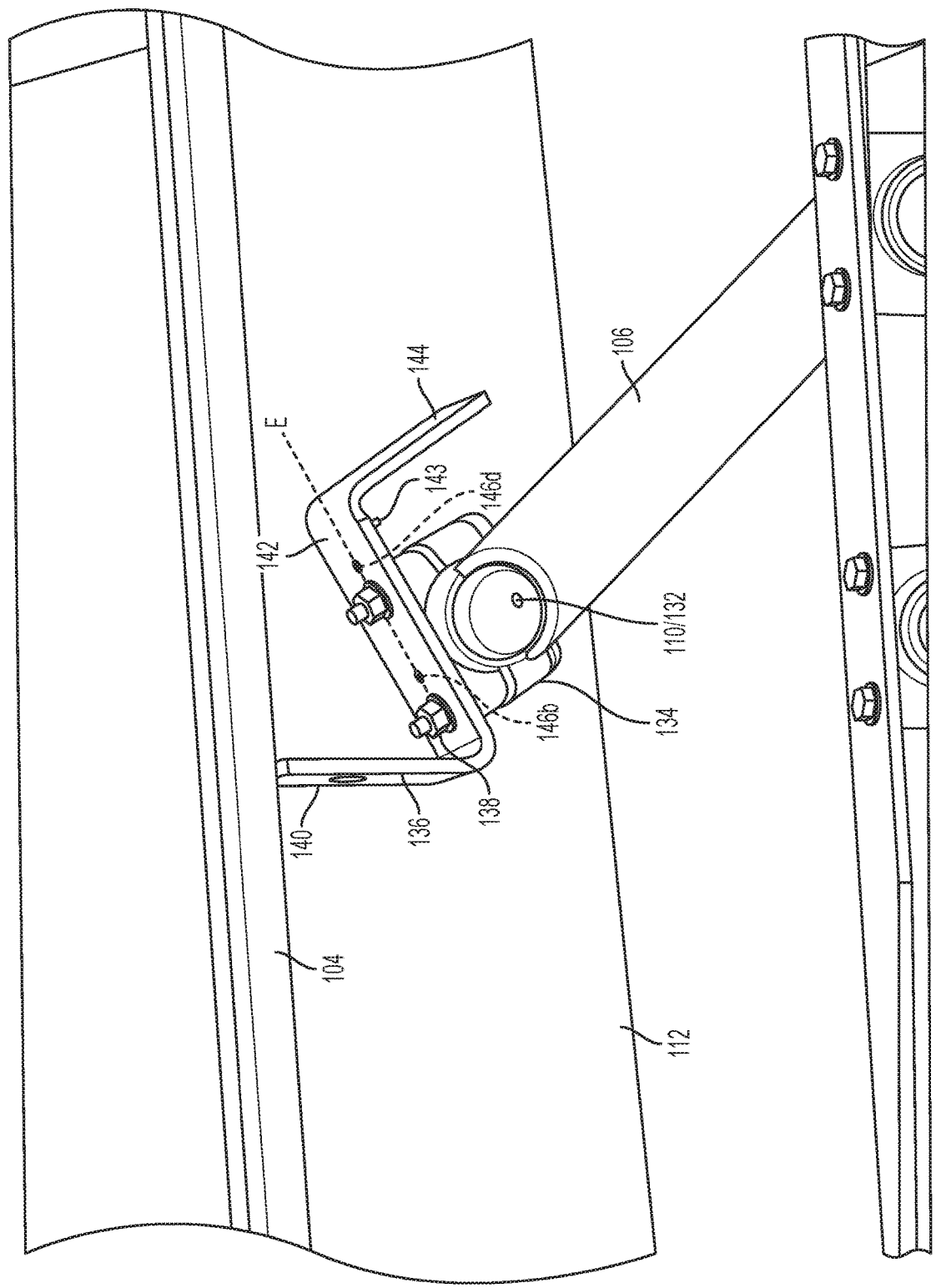
FIG. 3 is an isometric view of the detailed view of FIG. 2.

Referring now to the details of the invention, FIGS. 1-3 depict a cleaning system 100 (system 100, hereinafter) for a combine harvester, according to a first exemplary embodiment of the invention.

The cleaning system 100 includes a frame 102 that is fixed to the chassis of the combine. Alternatively, item 102 may represent the chassis of the combine. The frame 102 remains stationary during operation of the cleaning system 100. A sieve shoe 104 (or shoe 104) is pivotably connected to the frame 102 by two or more rocker arms 106 and a pitman arm 120. The shoe 104 is configured to hold a sieve (not shown).

The pitman arm 120 is connected to the side 112 of the shoe 104 near the proximal end 104a of the shoe 104 for moving the shoe 104 along an arc path. Pitman arms are well known to those skilled in the art. Briefly, an input shaft 113, which is powered by the combine, is mounted to the frame 102, and an eccentric wheel 122 is mounted to the input shaft 113 such that the eccentric wheel 122 rotates with the input shaft 113. The shaft 113 is radially offset from the center of the wheel 122. The pitman arm 120 is pivotally mounted to the eccentric wheel 122 such that the eccentric wheel acts as a crank and the pitman arm 120 acts as a connecting rod which drives the shoe 104 through an oscillating arc path 'T.'

Other styles of pitman arms are known to those skilled in the art and may be used with the cleaning system 100.

As best shown in FIG. 2, a pivoting rocker arm 105 connects the proximal end 104a of the shoe 104 to the frame 102. Another pivoting rocker arm 106 connects the distal end 104b of the shoe 104 to the frame 102. The rockers arms 105 and 106, which may also be referred to in the art as hanger arms, form part of a four bar linkage that together guide motion of the shoe 104. A first end 108 of the rocker arm 106 is pivotally mounted to a fixed point on the frame 102, and a second opposing end 110 of the rocker arm 106 is pivotally connected to the side 112 of the shoe 104. The first end 108 of the rocker arm 106 includes a shaft 126 that is mounted to a two piece bearing 127. The bearing 127 is mounted to the frame 102 by two bolts 130, for example. The first end 108 pivots about the bearing 127. The second end 110 of the rocker arm 106 includes a shaft 132 that is mounted to a two piece bearing 134. The bearing 134 is mounted to a bracket 136 by two bolts 138, for example.

Although not shown, another set of rocker arms and another pitman arm may be positioned on the side of the shoe 104 that is opposite side 112. Also, although not shown, the rocker arm 105 may be connected to both the frame 102 and the shoe 104 in the same manner as the rocker arm 106.

As best shown in FIG. 3, the bracket 136 includes a vertical portion 140 that is fixed to the side. 112 of the shoe 104, a slanted upwardly extending portion 142 that depends from the vertical portion 140, and a downwardly extending portion 144 that depends from and extends orthogonally to the slanted portion 142. The slanted upwardly extending portion 142 is oriented tangentially to the arc trajectory 'T' of the end 110 of the rocker arm 106 that is connected to the shoe 104. An acute interior angle C (FIG. 2) is formed between the slanted portion 142 and the vertical portion 140. The portion 142 is also slanted with respect to a horizontal plane running along the top side of the shoe 104 by an angle D. The vertical portion 140 is orthogonal to the horizontal plane.

The slanted upwardly extending portion 142 may deviate from that which is shown and described. For example, the mounting surface 143 of the portion 142 upon which the bearing 134 is mounted could be curved and non-planar.

A plurality of thru-holes 146a-146d (referred to either individually or collectively as hole(s) 146) are disposed through the portion 142. The holes 146 are aligned and evenly spaced apart in a row along an axis E (FIG. 3) running through the center of the portion 142. The holes 146 are each sized to receive a fastener 138. Using the holes 146 and the fasteners 138, the bearing 134 may be positioned at different locations on the mounting surface 143. Holes 146a and 146c are used together as shown to receive the two fasteners 138 attached to the bearing 134 in a first location of the bearing 134. Alternatively, the holes 146b and 146d may be used together to receive the two fasteners 138 attached to the bearing 134 in a second location of the bearing 134. More holes 146 may be disposed along the length of the portion 142 providing more positioning options for the bearing 134 on the portion.

The position of the bearing 134 on the mounting surface 143 of the bracket 136 affects the throwing angle A of the rocker arm 106, and the throwing angle of the shoe 104 mimics the throwing angle A of the rocker arm 106. As best shown in FIG. 1, the throwing angle A of the rocker arm 106 may be defined as the angle A between the arm 106 at its midstroke M (of the arc trajectory T) and a vertical line V intersecting the bottom end of the arm 106. It is noted that the arm 106 is not positioned at its midstroke in FIGS. 1 and 2.

The throwing angle A of the rocker arm 106 can be changed by mounting the bearing 134 of the arm 106 at different locations on the mounting surface 143 of the slanted portion 142 of the bracket 136. When the fasteners 138 of the bearing 134 are connected to holes 146a and 146c (as shown) of the bracket 136, which may be referred to as Position 1, the throwing angle A of the rocker arm 106 is equal to a first predetermined angle. The first predetermined angle is sufficient for throwing heavier crop, whereas that same angle may be too large for lighter crop (such as flax seed, canola seed, or mustard seed) and can cause the lighter crop to be thrown too far and/or high. When the fasteners 138 of the bearing 134 are connected to holes 146b and 146d, which may be referred to as Position 2, the throwing angle A is equal to a second predetermined angle that is smaller than the first predetermined angle. The second predetermined angle is sufficient for throwing lighter crop.

Moving the bearing 134 from Position 1 to Position 2 reduces the vertical component of the stroke of the arm 106 and increases the horizontal component of the stroke of the arm 106. As stated above, the stroke of the shoe 104 mimics the stroke of the arm 106. Accordingly, moving the bearing 134 along surface 142 from Position 1 to Position 2 increases the tendency of the crop in the shoe 104 to move horizontally rather than vertically during the throw stroke.

Conversely, moving the bearing 134 from Position 2 to Position 1 increases the tendency of the crop in the shoe 104 to move vertically rather than horizontally during the throw stroke.

To move the arm 106 from Position 1 to Position 2, it is only necessary to remove the fasteners 138, slide the bearing 134 to Position 2, and refasten the bearing 134 to the bracket 136 at Position 2 using the fasteners 138. Conversely, to move the arm 106 from Position 2 to Position 1, it is only necessary to remove the fasteners 138, slide the bearing 134 to Position 1, and refasten the bearing 134 to the bracket 136 at Position 1 using the fasteners 138. It is not necessary to remove the entire arm 106, remove the bearing 127 or adjust the first end 108 of the arm 106.

Figure 4:
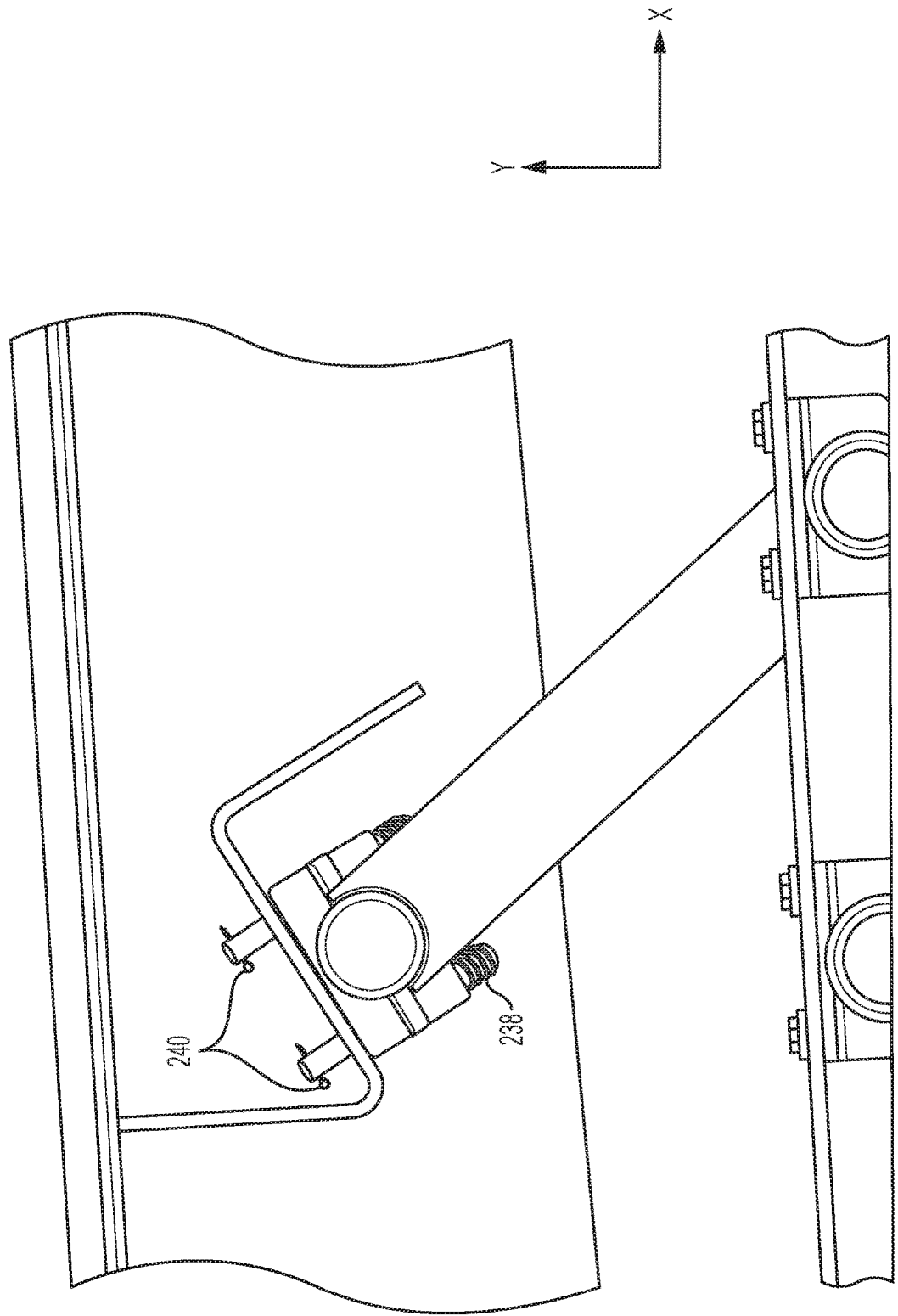
FIG. 4 depicts a side elevation view of a cleaning system of a combine according to an alternative embodiment.

FIG. 4 depicts a second exemplary embodiment of a cleaning system. The cleaning system of FIG. 4 is substantially similar to the cleaning system of FIG. 1, and only the differences will be described. In the cleaning system of FIG. 4, the fasteners 138 in the bearing 134 are replaced with retractable spring-loaded pins 238 that are releasably positioned within the holes 146. Such pins 238 do not require a tool, such as a wrench, for installing, removing or moving the bearing 134 on the mounting surface 143. Optionally, a cotter pin 240 may be removably connected to the ends of the pins 238 to secure the pins 238 to the bracket 136 and the bearing 134. As an alternative to the cotter pin 240, a quarter-turn fastener, a cam-lock latch, a latch, a clip, ring or clamp may be used to secure the pins 238 to the bracket 136 and the bearing 134.

Figure 5:
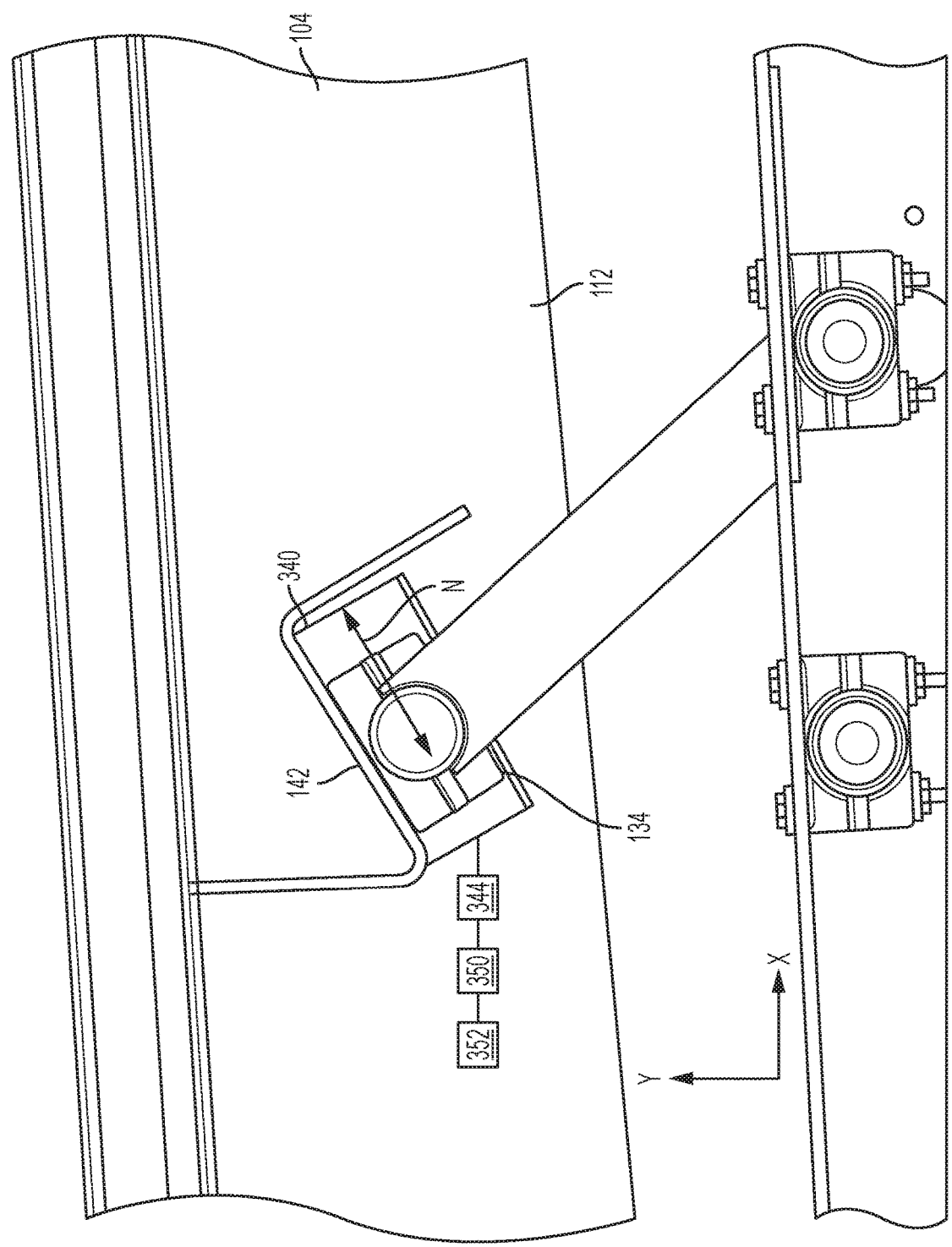
FIG. 5 depicts a side elevation view of a cleaning system of a combine according to another alternative embodiment.

FIG. 5 depicts a third exemplary embodiment of a cleaning system. The cleaning system of FIG. 5 is substantially similar to the cleaning system of FIG. 1, and only the differences will be described. In the cleaning system of FIG. 5, rails 340 (one shown) extend from the opposing sides of the slanted portion 142 of the bracket 136. The bearing 134 is held between the rails 340 to constrain the bearing 134 between the rails 340 in the Z direction. The rails 340 are parallel to the wall 112 of the shoe 104. An actuator 344 is physically connected to the bearing 134 for sliding the bearing 134 on the mounting surface 143 of the slanted portion 142 of the bracket 136 along direction N. The actuator 344 may be an electrical actuator, an electomechanical actuator, or a hydraulic cylinder, for example. Operation of the actuator 344 is controlled by a controller 350. Although not shown, another actuator may be connected to a rocker arm on the opposing side of the shoe.

The controller 350 may be manually controlled by a switch in the operator's station of the combine. For example, during operation of the combine, an operator of the combine may adjust the switch, thereby instructing the controller 350 to activate the actuator 344 to slide the bearing 134 along the bracket 136, thereby adjusting the throwing angle A of the shoe 104. The switch may have particular throwing angle settings for particular crops (heavy or light) or field conditions (e.g., uphill and downhill).

As noted above, the throwing angle A may be adjusted to compensate for the weight of the threshed crop in the shoe 104. Also, the throwing angle A may be adjusted to compensate for the fore-to-aft inclination (uphill-downhill) of the combine. For example, while the combine is moving downhill, it may be advantageous to increase the throwing angle A, by operating the switch to instruct the controller 350 to activate the actuator 344 to slide the bearing 134 downward along the bracket 136, thereby causing the threshed crop in the shoe 104 to be thrown rearwardly to a greater extent. Conversely, while the combine is moving uphill, it may be advantageous to decrease the throwing angle A, by operating the switch to instruct the controller 350 to activate the actuator 344 to slide the bearing 134 upward along the bracket 136, thereby causing the threshed crop in the shoe 104 to be thrown rearwardly to a lesser extent.

The combine may have a sensor 352, such as an inclinometer or gyroscope, which actively detects the extent and direction of the fore-to-aft inclination of the combine. The sensor 352 may be connected to the controller 350 such that the controller 350 can automatically adjust the throwing angle A (i.e., by activating the actuator 344 to slide the bearing 134 along the bracket 136) based upon the measurements of the sensor 352, and without user intervention.

It is to be understood that the above-described operating steps are performed by the controller 350 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 350 described herein, such as the aforementioned method of operation, is implemented in software code or instructions which are tangibly stored on the tangible computer readable medium. Upon loading and executing such software code or instructions by the controller 350, the controller 350 may perform any of the functionality of the controller 350 described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by, a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Figure 6:
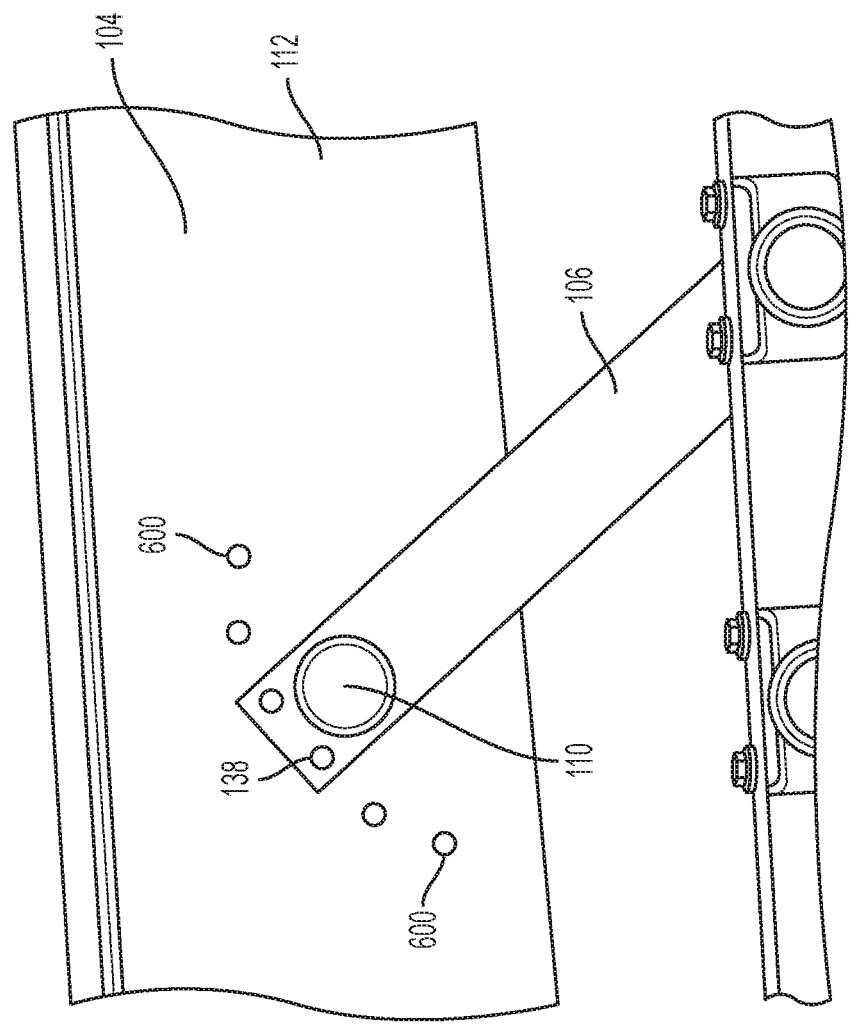
FIG. 6 depicts a side elevation view of a cleaning system of a combine according to yet another alternative embodiment.

FIG. 6 depicts a fourth exemplary embodiment of a cleaning system. The fourth embodiment is substantially similar to the first embodiment with the exception that the bracket 136 is omitted and replaced by a series of holes 600 (e.g., six holes) that are disposed in the side 112 of the shoe 104. The holes 600 are aligned along the arc trajectory 'T' of the end 110 of the rocker arm 106. In use, the end 110 of the rocker arm 106 could be mounted to two of those six holes 600 using fasteners 138 such that the throwing angle A of the rocker arm 106 is maintained at the first predetermined angle. Alternatively, the end 110 of the rocker arm 106 could be mounted to two different holes of the six holes 600 such that the throwing angle A of the rocker arm 106 is maintained at the second predetermined angle.

FIG. 7 depicts a fifth exemplary embodiment of a cleaning system. The fifth embodiment is substantially similar to the first embodiment with the exception that the first end 110 of the rocker arm 106 is fixed to the shoe 104 at only one position, and the second end 108 of the rocker arm 106 is selectively mounted to a subset of the series of holes 702 (e.g., five holes) that are disposed on a curved surface 704 of the frame 102 using fasteners 130. The curve 704 is centered about the axis passing through the end 110 of the rocker arm 106. In use, the end 108 of the rocker arm 106 could be mounted to two of those five holes 702 such that the throwing angle A of the rocker arm 106 is maintained at the first predetermined angle. Alternatively, the end 108 of the rocker arm 106 could be mounted to two different holes of the five holes 702 such that the throwing angle A of the rocker arm 106 is maintained at the second predetermined angle.

It should be understood that the individual features of the various embodiments described herein may be combined.

Although the invention is illustrated and described herein with reference to specific embodiments, the invention is not intended to be limited to the details shown. Rather various modifications may be made in the details within the scope and range of equivalence of the claims and without departing from the invention.

What is claimed is:

1. A cleaning system for a combine harvester having an adjustable throwing angle, the cleaning system comprising:
    a shoe for holding a sieve of the cleaning system;
    a mounting surface disposed on the shoe; and
    a rocker arm either movably or removably connected to the mounting surface, the rocker arm being configured to be mounted to the mounting surface at at least two different locations on the mounting surface, each location resulting in a different throwing angle of the shoe of the cleaning system.

2. The cleaning system of claim 1, wherein the mounting surface is either curved or slanted relative to a horizontal plane and a vertical plane.

3. The cleaning system of claim 1, wherein the rocker arm includes two opposed ends, one opposed end being releasably connected to the mounting surface, and the other opposed end being connected to a fixed point on the combine harvester.

4. The cleaning system of claim 3 further comprising bearings mounted to each end of the opposed ends of the rocker arm.

5. The cleaning system of claim 3 further comprising a frame of the combine harvester, said other opposed end being mounted to the frame.

6. The cleaning system of claim 3 further comprising one or more threaded fasteners for releasably mounting said one opposed end of the rocker arm to the mounting surface.

7. The cleaning system of claim 3 further comprising a tool-less retention device for releasably mounting said one opposed end of the rocker arm to the mounting surface.

8. The cleaning system of claim 3 further comprising an actuator for moving said one opposed end of the rocker arm on the mounting surface.

9. The cleaning system of claim 8, wherein said actuator is an electric linear actuator or a hydraulic cylinder.

10. The cleaning system of claim 8, further comprising a controller for actuating said actuator to change the location of said one opposed end of the rocker arm on the mounting surface.

11. The cleaning system of claim 8, wherein the controller is configured to actuate said actuator based upon either a user input or feedback from a sensor that is connected to the controller.

12. A combine harvester comprising:
    a shoe for holding a sieve of a cleaning system of the combine harvester;
    a mounting surface either attached to or extending from the shoe, the mounting surface being either slanted or curved;
    a frame for supporting the shoe, the shoe being movably connected to the frame by a rocker arm; and
    wherein the rocker arm includes two opposed ends, one opposed end being releasably connected to the mounting surface of the shoe, and the other opposed end being connected to the frame, said one opposed end of the rocker arm being configured to be mounted to the mounting surface at at least two different locations on the mounting surface, each location resulting in a different throwing angle of the shoe of the cleaning system.

13. The combine harvester of claim 12, wherein the mounting surface is slanted relative to horizontal plane and a vertical plane.

14. The combine harvester of claim 12 further comprising one or more threaded fasteners for releasably mounting said one opposed end of the rocker arm to the mounting surface.

15. The combine harvester of claim 12 further comprising a tool-less retention device for releasably mounting said one opposed end of the rocker arm to the mounting surface.

16. The combine harvester of claim 12 further comprising an actuator for moving said one opposed end of the rocker arm on the mounting surface.

17. The combine harvester of claim 16, wherein said actuator is an electric linear actuator or a hydraulic cylinder.

18. The combine harvester of claim 16, further comprising a controller for actuating said actuator to change the location of said one opposed end of the rocker arm on the mounting surface.

19. The combine harvester of claim 16, wherein the controller is configured to actuate said actuator based upon either a user input or feedback from a sensor that is connected to the controller.

20. A combine harvester comprising:
    a shoe for holding a sieve of a cleaning system of the combine harvester;
    a frame for supporting the shoe; and
    a rocker arm pivotably connecting the shoe to the frame, wherein the rocker arm includes two opposed ends, one opposed end being releasably connected to a mounting surface disposed on one of the shoe and the frame, and the other opposed end being connected to the other of the shoe and the frame, said one opposed end of the rocker arm being configured to be mounted to the mounting surface at at least two different locations on the mounting surface, each location resulting in a different throwing angle of the shoe of the cleaning system.

* * * * *